United States Patent
Zimmer et al.

[19]

[11] Patent Number: 5,887,732
[45] Date of Patent: Mar. 30, 1999

[54] RACK WITH HEAVY DUTY ROLLERS IN BACK

[75] Inventors: Gary E. Zimmer, Fort Worth, Tex.; Thomas E. McEachron, Louisville, Ky.; Kenneth J. Oser, Shepherdsville, Ky.; Richard Tipton, Jeffersontown, Ky.

[73] Assignee: The Interlake Companies, Inc., Lisle, Ill.

[21] Appl. No.: 798,288

[22] Filed: Feb. 7, 1997

[51] Int. Cl.⁶ ............................................. A47F 1/04
[52] U.S. Cl. ................................. 211/59.2; 211/151
[58] Field of Search .................... 211/59.2, 151

[56] References Cited

U.S. PATENT DOCUMENTS

| | | | |
|---|---|---|---|
| 1,745,784 | 2/1930 | Davis | 211/59.2 X |
| 2,738,103 | 3/1956 | Bisese | 211/59.2 X |
| 2,786,578 | 3/1957 | De Graaf et al. | 211/59.2 |
| 2,969,863 | 1/1961 | Woldring et al. | 211/59.2 X |
| 3,894,634 | 7/1975 | Gotham et al. | 248/245 X |
| 3,900,112 | 8/1975 | Azzi et al. . | |
| 4,372,451 | 2/1983 | Rasmussen et al. | 211/181 |
| 4,383,614 | 5/1983 | Miller | 211/59.2 |
| 4,394,910 | 7/1983 | Miller | 211/59.2 |
| 4,453,641 | 6/1984 | Rasmussen et al. | 211/151 |
| 4,765,493 | 8/1988 | Kinney . | |
| 4,955,489 | 9/1990 | Allen | 211/59.2 X |
| 5,090,547 | 2/1992 | Schafer | 211/151 X |
| 5,115,920 | 5/1992 | Tipton et al. . | |
| 5,259,518 | 11/1993 | Sorenson et al. . | |
| 5,295,591 | 3/1994 | Slater | 211/59.2 |
| 5,295,592 | 3/1994 | Thorne | 211/59.2 |
| 5,297,430 | 3/1994 | Benton | 211/59.2 X |
| 5,314,078 | 5/1994 | Morikiyo et al. | 211/59.2 |
| 5,524,776 | 6/1996 | Hall et al. | 211/59.2 X |
| 5,617,961 | 4/1997 | Konstant et al. | 211/151 |
| 5,645,176 | 7/1997 | Jay | 211/59.2 |

*Primary Examiner*—Daniel P. Stodola
*Assistant Examiner*—Khoa Tran
*Attorney, Agent, or Firm*—Theresa Camoriano; Wheat, Camoriano, Smith & Beres PLC

[57] ABSTRACT

A gravity feed storage rack includes two different types of roller strips. Heavy duty roller strips are located in the back to absorb the impact of products being dropped on the back of the rack. Regular duty roller strips extend to the front of the rack so that products can roll forward to the front of the rack. The heavy duty roller strips may lie behind the regular roller strips or may lie between the regular roller strips in the rear portion of the rack.

6 Claims, 6 Drawing Sheets

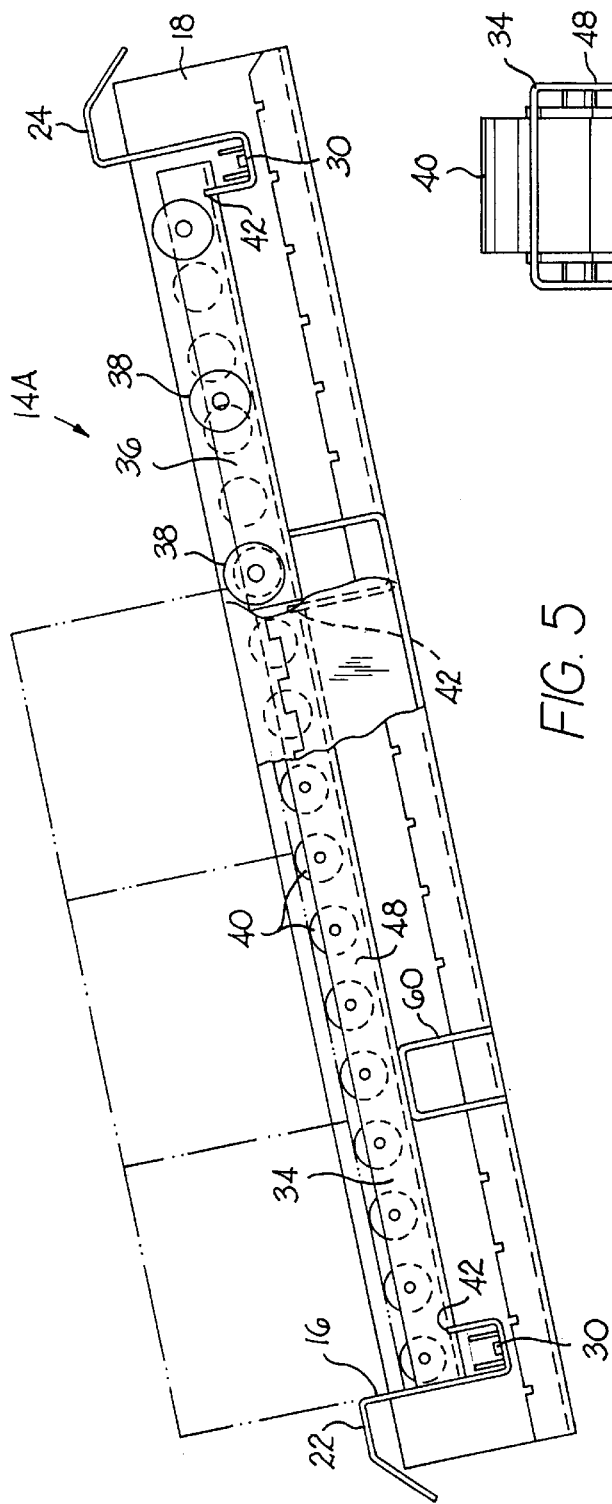
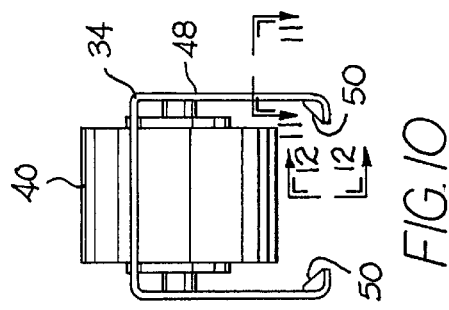
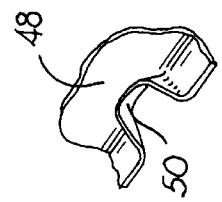
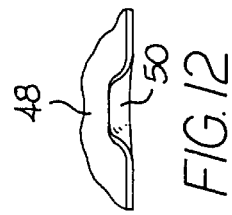
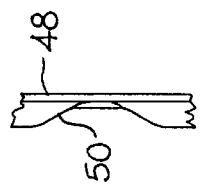

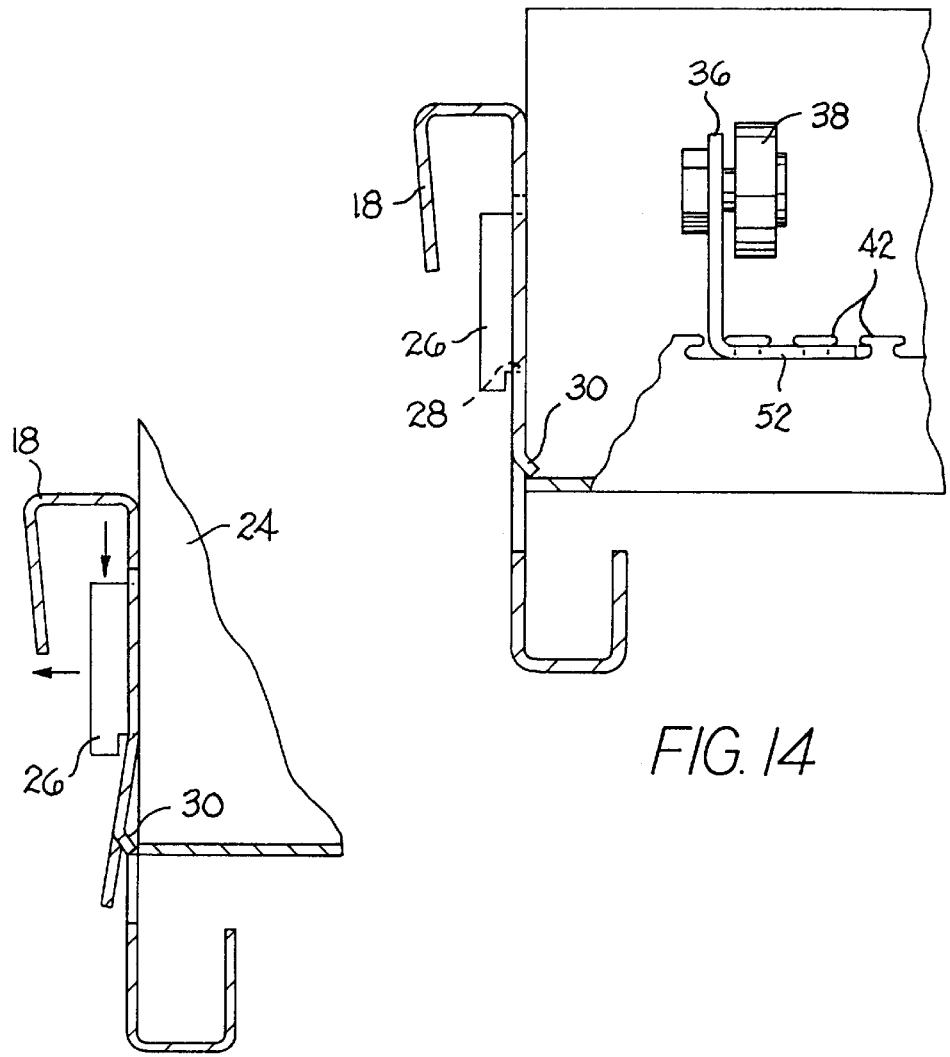
FIG. 14
FIG. 15
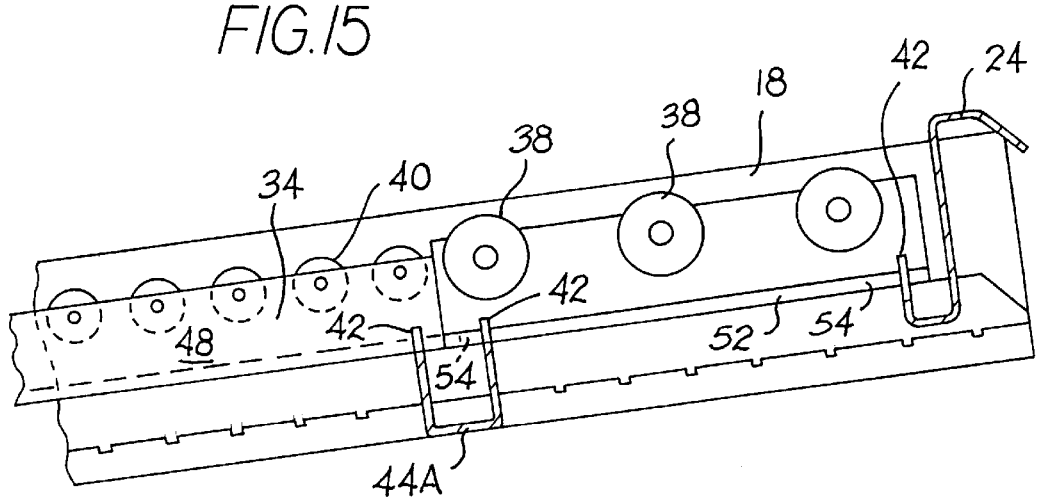
FIG. 20

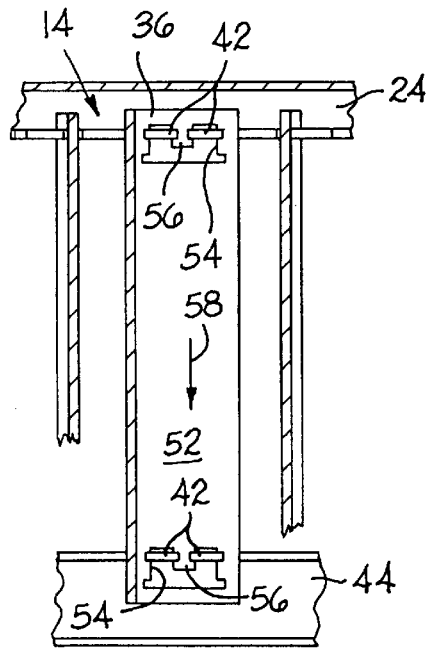
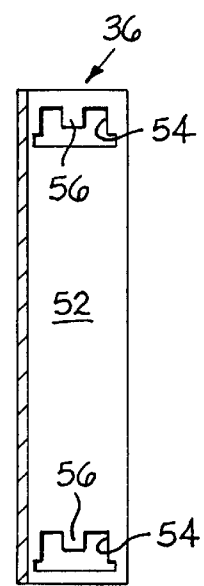
FIG.16    FIG.17
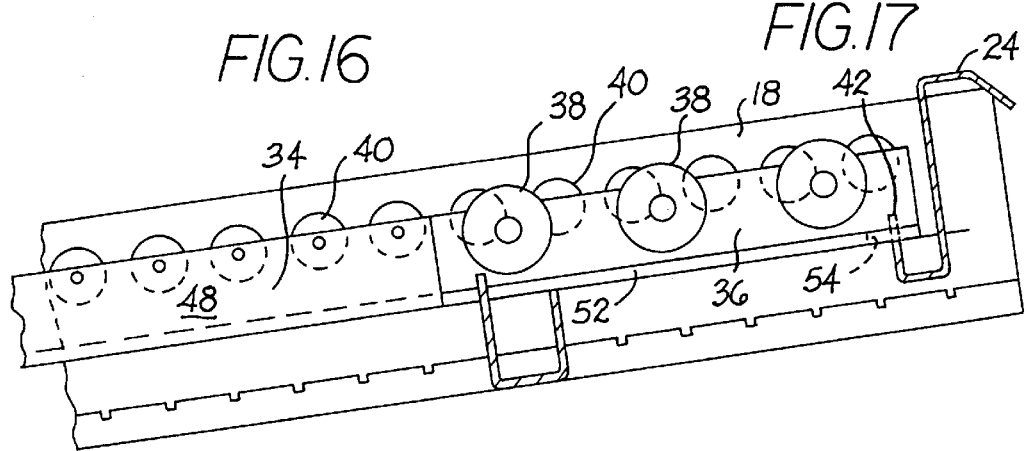
FIG.18
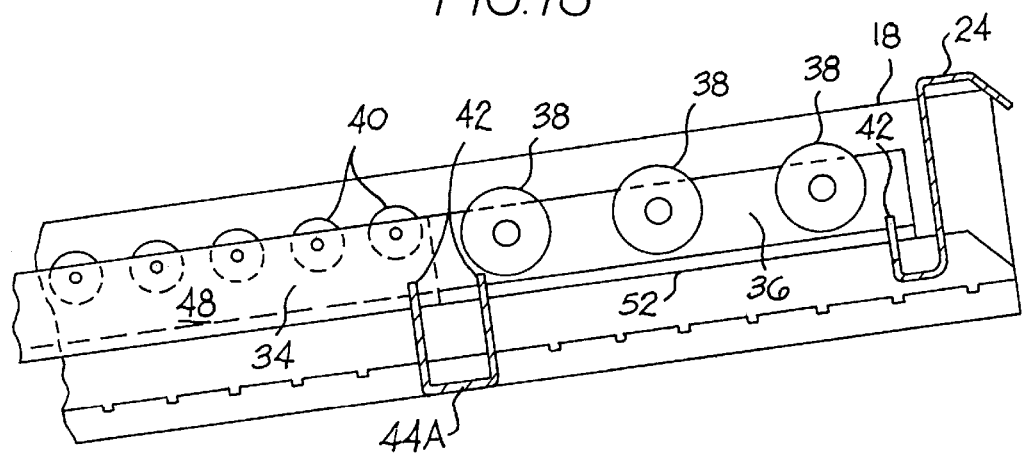
FIG.19

RACK WITH HEAVY DUTY ROLLERS IN BACK

BACKGROUND OF THE INVENTION

This invention relates to storage racks, and, in particular, to gravity-flow storage racks which rely upon inclined, non-driven rollers (idler rollers) to bring products to the front of the rack.

Gravity-flow storage racks with idler rollers are well known. They include a plurality of inclined roller platforms. Usually, these racks are loaded from the back, so that each product rolls down its respective inclined roller platform until it reaches a stop at the front of the platform or until it bumps into a product in front of it.

When the products are loaded onto the back of the rack, they are dropped onto the rack. The problem in prior art racks is that the impact of products being dropped onto the rollers can damage the rollers. In order to solve that problem, in many cases, a plate is put on the back of the rack so that the product drops onto the plate and does not drop directly onto the rollers. However, if the product is dropped onto a plate, then someone has to push the product forward until it reaches the rollers, so it can roll forward. If the products are heavy, this can be hard work, requiring expensive manpower. Of course, it would be possible to build the rollers strong enough that they could absorb the impact of the products being dropped on them, but that would make the rack prohibitively expensive.

SUMMARY OF THE INVENTION

The present invention provides an improved rack, which has heavy-duty rollers in the back portion of the rack to absorb the impact of the product, thereby protecting the regular rollers. This eliminates the need to push the products forward from a plate onto the rollers which is required in the prior art.

In one preferred embodiment, there are rows of heavy-duty rollers in between the rows of regular rollers in the back portion of the rack. The heavy-duty rollers may be at the same height as the regular rollers, or they may be slightly higher than the regular rollers.

In other preferred embodiments, the regular rollers and heavy duty rollers lie in the same rows, with the heavy duty rollers making up the back portion of the row and the regular rollers making up the rest of the row.

BRIEF DESCRIPTION OF THE DRAWINGS

FIG. 5 is a side sectional view of the top platform of the rack of FIG. 1;

FIG. 10 is an end view of one of the regular roller tracks of FIG. 2;

FIG. 11 is a view along the section 11—11 of FIG. 10;

FIG. 12 is a view taken along the section 12-12 of FIG. 10;

FIG. 13 is a top perspective view of the portion of the roller track shown in FIG. 12;

FIG. 14 is a broken-away view taken along the section 14—14 of FIG. 2;

FIG. 15 is an enlarged, broken-away view of the section shown in FIG. 14 as it is being assembled;

FIG. 16 is a view taken along the section 16—16 of FIG. 3;

FIG. 17 is a view of just the roller track portion of FIG. 16;

FIG. 18 is the same view as FIG. 3, but showing a second embodiment of the invention;

FIG. 19 is the same view as FIG. 3, but showing a third embodiment of the invention; and FIG. 20 is the same view as FIG. 3, but showing a fourth embodiment of the invention.

DESCRIPTION OF THE PREFERRED EMBODIMENTS

Figure 1:
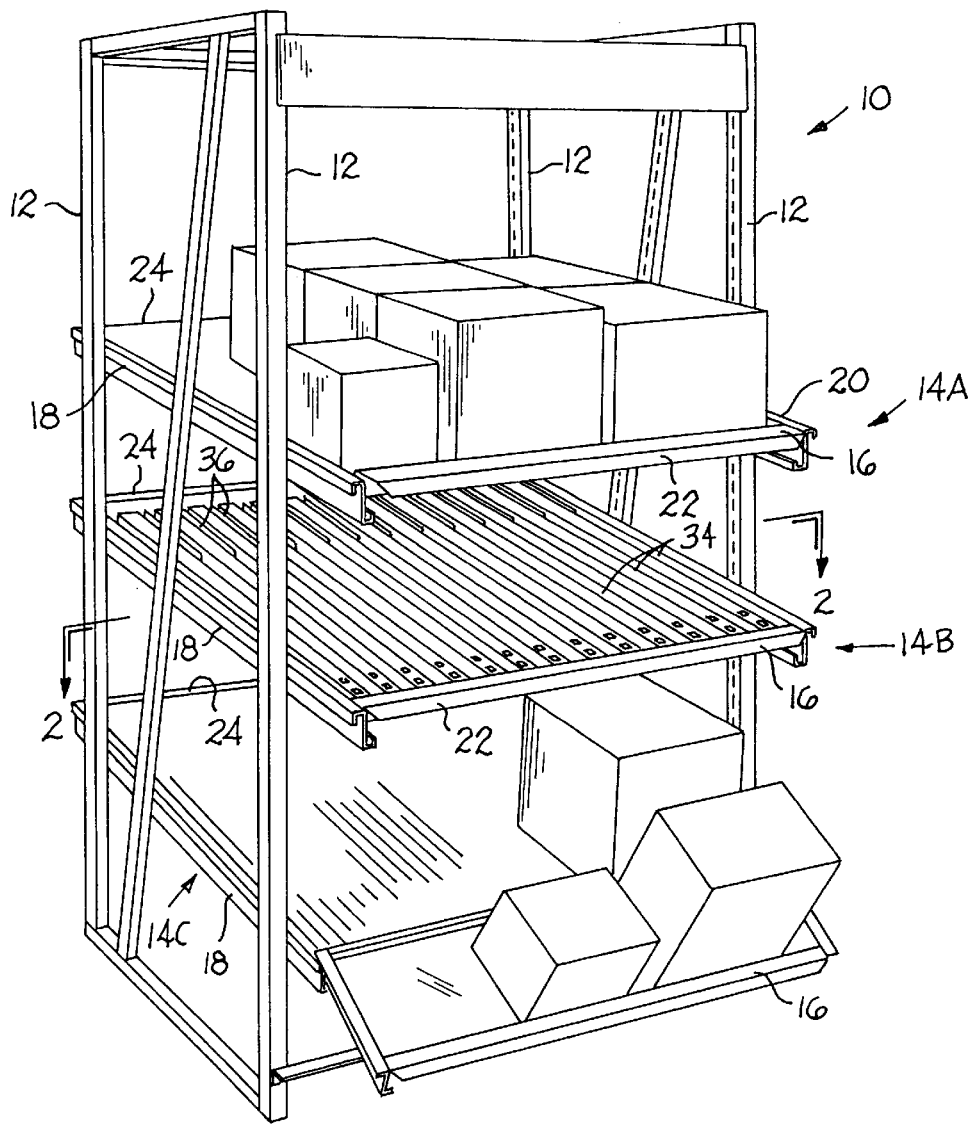
FIG. 1 is a perspective view of a rack made in accordance with the present invention.

FIG. 1 shows a gravity flow rack 10 made in accordance with the present invention. The rack 10 includes a plurality of vertical columns 12, which are interconnected to form the framework of the rack 10. This particular rack 10 includes three roller platforms 14A, 14B, 14C, which are mounted on the framework. The roller platforms 14A—C are mounted at an incline so that products roll downward, toward the front of the rack, by gravity. There is a stop 16 at the front of each platform 14A—C to stop the products from rolling off the front of the rack.

Figure 7:
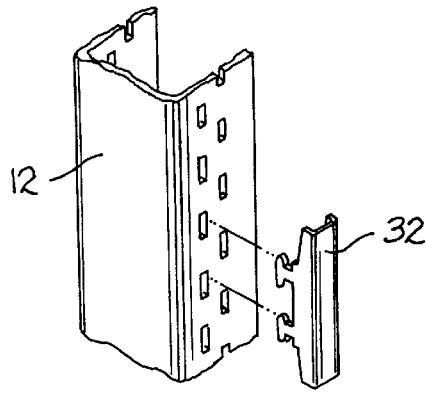
FIG. 7 is an exploded perspective view of a portion of one of the columns of FIG. 1 and one of the clips which supports a platform on the column.
Figure 8:
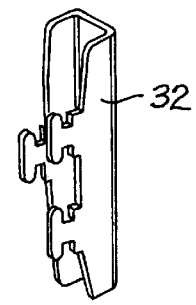
FIG. 8 is a perspective view of the clip of FIG. 7.
Figure 9:
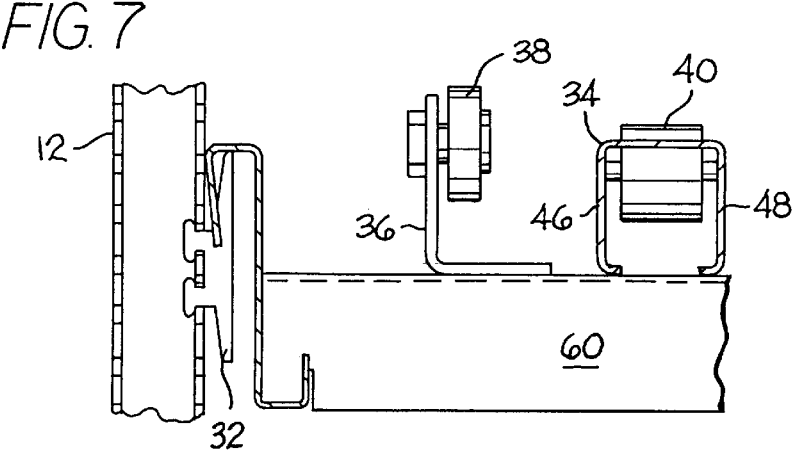
FIG. 9 is a view taken along the section 9—9 of FIG. 2.

Each roller platform 14A–C includes a left frame member 18, a right frame member 20, a front frame member 22, and a rear frame member 24. The front frame member 22 includes the stop 16. The frame members 18, 20, 22, 24 are connected together as shown in FIGS. 4–6 and 14–15, with a hook 26 from one frame member fitting into a slot 28 in the next adjacent frame member and a locking leg 30 preventing the hook 26 from being lifted out of the slot 28. The left and right frame members 18, 20 hang from clips 32, which are mounted on their respective columns 12, as shown in FIGS. 7–9.

Each roller platform 14A–C includes two different types of roller tracks or strips, as shown in FIGS. 2–6. The regular duty roller tracks 34 extend all the way to the front of the rack 10. The heavy duty roller tracks 36, which are designed to withstand heavier impacts than the regular duty tracks, are located only in the rear portion of the platforms 14A–C.

Figure 2:
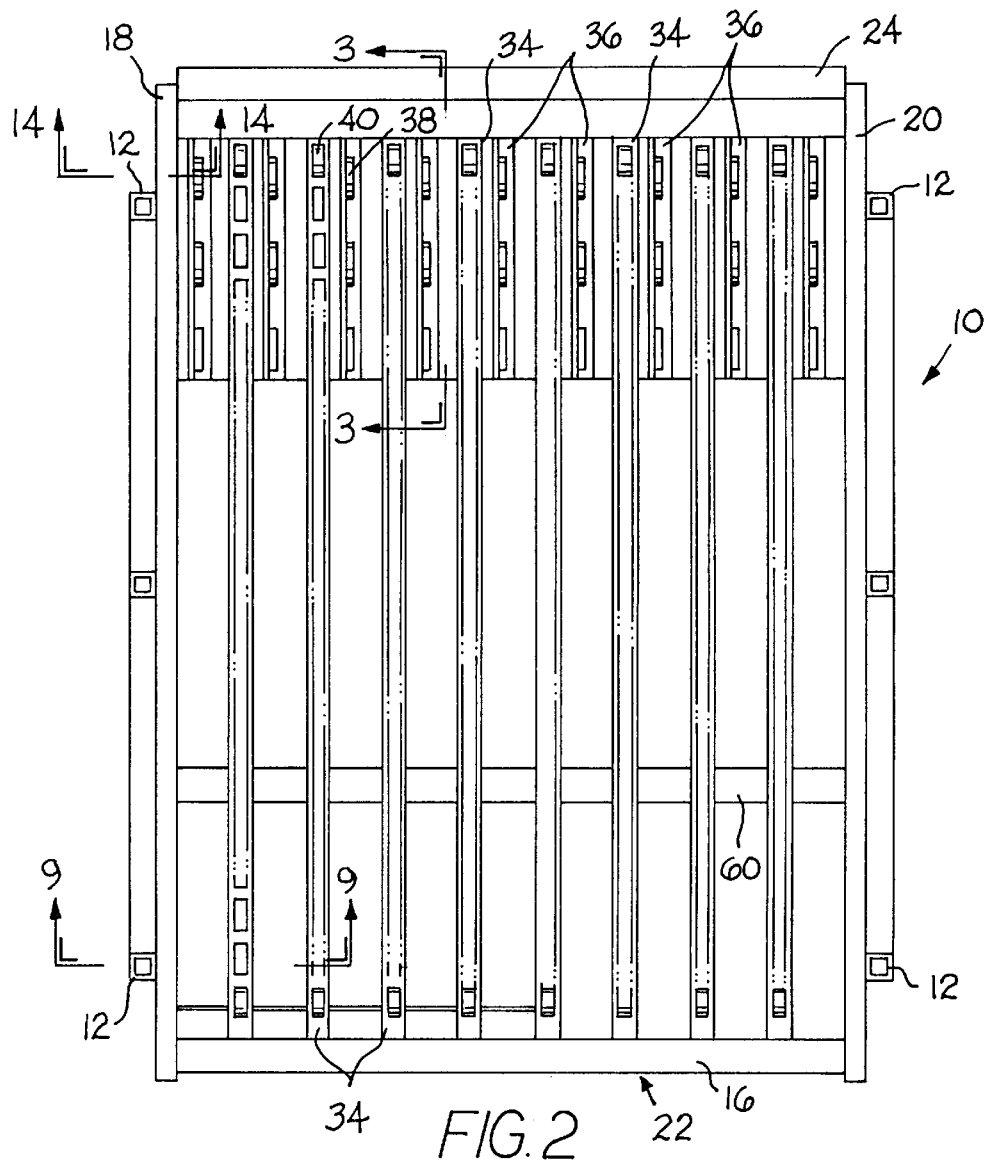
FIG. 2 is a view taken along the section 2—2 of FIG. 1.
Figure 3:
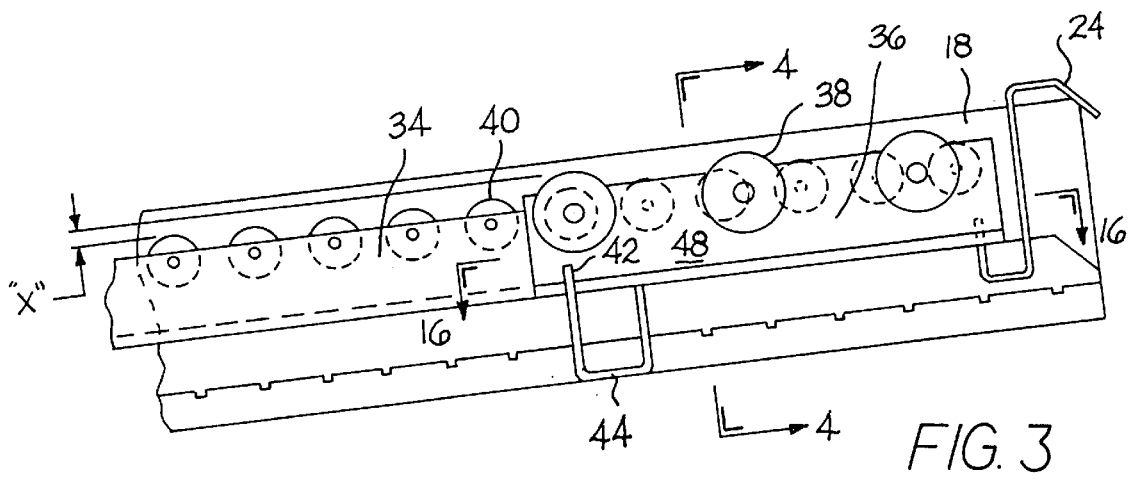
FIG. 3 is a view taken along the section 3—3 of FIG. 2.

In the first embodiment, shown in FIGS. 2 and 3, the heavy duty roller tracks 36 are parallel to the regular duty tracks 34 and lie between the regular duty tracks 34. The heavy duty rollers 38 lie slightly above the regular duty rollers 40, as shown in FIG. 3. Thus, when a package is dropped onto the back of the rack 10, it only hits the heavy duty rollers 38, thereby protecting the regular rollers 40. The regular duty rollers are preferably made with a plastic axle, while each of the heavy duty rollers 38 is mounted on a metal bolt which is fixed to the track or beam 36.

Figure 6:
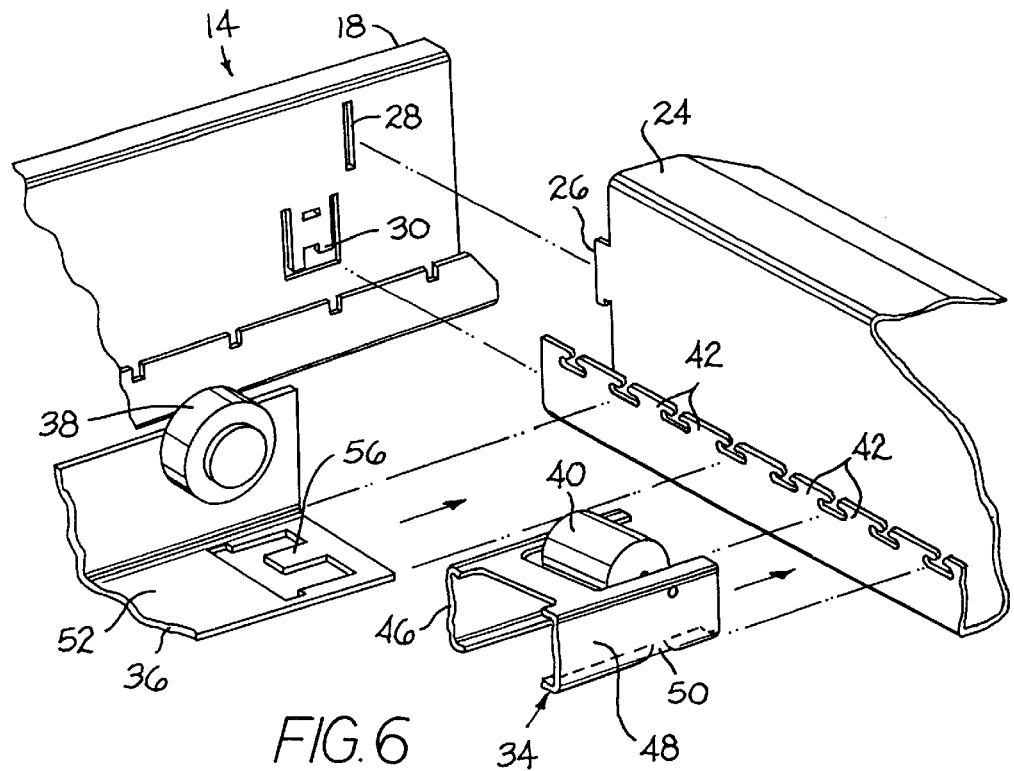
FIG. 6 is a broken-away exploded perspective view of the left rear corner of the platform of FIG. 2.

FIGS. 3, 15, and 6 show how the roller tracks 34, 36 are supported on the platforms 14A–C. The front and rear frame members 22, 24 of the platforms 14A–C include T-shaped teeth 42. There is also an intermediate beam 44, which is supported on the left and right frame members 18, 20 and which includes T-shaped teeth 42 aligned with the respective T-shaped teeth 42 on the forward and rear frame members 22, 24.

Figure 4:
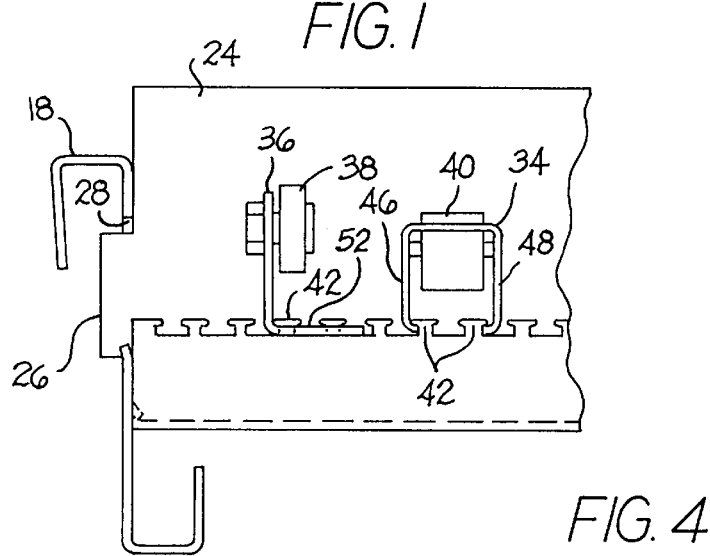
FIG. 4 is a view taken along the section 4—4 of FIG. 3.

In the embodiment of FIG. 2, the regular roller tracks 34 have legs 46, 48 which are received in the teeth 42 of the rear frame member 24, the intermediate beam 44, and the front frame member 22, as shown in FIGS. 3 and 6. The teeth 42 of the front frame member 22 and of the intermediate member 44 are not shown in as much detail as the teeth 42 of the rear member 24, but the teeth 42 are identical in all three members in the preferred embodiment. The regular tracks 34 include indentations 50, as shown in FIGS. 6 and 10–13, which permit the track 34 to drop down between the teeth 42. Then the track 34 is slid forward until it abuts the forward frame member 22. At this point, the indentations 50 are not aligned with the teeth 42, so the tracks 34 are locked in place on the platform 14. FIG. 4 shows the track 34 as it is received in the teeth 42.

The heavy duty roller tracks 36 are preferably made with an L-shaped cross-section, with the horizontal leg 52 of the L being received by the teeth 42. The heavy duty roller tracks 36 are mounted on the rear frame member 24 and the intermediate beam 44.

As shown in FIG. 17, the horizontal leg 52 has substantially U-shaped holes 54 in its front and rear portions, which define tongue-shaped projections 56. These U-shaped holes 54 permit the heavy duty track 36 to be received in the teeth 42, and the tongue 56 locks the heavy duty track 36 on the platform 14.

FIG. 16 shows that two of the T-shaped teeth 42 fit through the base of the U-shaped holes 54, and then the heavy duty track 36 is slid forward, as shown by the arrow 58, until the teeth 42 abut the track 36. The tongues 56 fit between the lower portions of the teeth 42 but are wider than the space between the upper portions of the T-shaped teeth 42, so the track 36 cannot be lifted up, out of the platform 14.

FIG. 18 shows a second embodiment of the invention, in which the tops of the heavy duty rollers 38 are coplanar with the tops of the regular duty rollers 40. Otherwise, this embodiment is identical to the first embodiment. In this case, when a product is dropped onto the back of the rack, the heavy duty rollers 38 still receive the impact of the products and prevent the axles of the regular duty rollers 40 from flexing to the point that they would break.

FIG. 19 shows a third embodiment, in which, instead of the heavy duty rollers 38 lying between the rows of regular rollers, the regular roller tracks 34 and the heavy duty roller tracks 36 are in-line with each other, with the heavy duty roller tracks 36 lying directly behind the regular duty roller tracks 34. As in the first two embodiments, the heavy duty roller tracks 36 extend for about two feet. The regular duty roller tracks 34 extend for the rest of the depth of the rack, which may be about ten feet. The tops of the regular rollers 40 and the tops of the heavy duty rollers 38 are coplanar, so that, when a product is dropped onto the rack, it hits the heavy duty rollers 38 in the back and then rolls forward and downward by gravity onto the regular rollers 40.

In this third embodiment, the intermediate beam 44A has teeth 42 on both of its legs. The forward teeth 42 receive the regular duty roller track 34, and the rear teeth 42 receive the heavy duty roller track 36.

A fourth embodiment is shown in FIG. 20. It is identical to the embodiment shown in FIG. 19, except that top surfaces of the heavy duty rollers 38 in the rear of the rack lie in a plane that is parallel to and above the plane of the regular rollers 40.

FIGS. 5, 14, and 15 show the manner in which the platform 14 is assembled and locked in position. This is described in detail in U.S. Pat. No. 5,115,920, "Tipton", which is hereby incorporated by reference.

It will be obvious to those skilled in the art that modifications may be made to the embodiments described above without departing from the scope of the present invention.

What is claimed is:

1. A gravity flow rack, comprising:
    a plurality of vertical columns connected together to form a rack framework;
    at least one product support platform mounted on said vertical columns and including:
        a platform frame defining a front, a back, a left side, a right side, and a top surface;
        a plurality of regular roller strips extending from the back of said frame to the front of said frame and supported on said frame, each regular roller strip including a beam and a plurality of rollers mounted on said beam, the top surfaces of said rollers lying in a plane which is at a higher elevation in the back of the rack than in the front of the rack, so as to provide a downwardly-sloping path for products to roll down by gravity to the front of the rack; and
        impact absorption means comprising a plurality of heavier duty roller strips mounted on said frame and located between said regular roller strips in the back portion of said frame, said heavier duty roller strips each including a set of heavier duty rollers, which can absorb greater impact than the regular rollers without breaking, so that, when a product is dropped onto the back of said platform, said product contacts the heavier duty rollers on said heavier duty roller strips, thereby protecting the adjacent regular roller strips against damage.

2. A gravity flow rack as recited in claim 1, wherein said heavier duty rollers are at the same elevation as the adjacent regular rollers.

3. A gravity flow rack as recited in claim 1, wherein said heavier duty rollers are at a higher elevation than the adjacent regular rollers.

4. A gravity flow rack as recited in claim 1, wherein said heavier duty roller strips are shorter in length than said regular roller strips.

5. A gravity flow rack, comprising:
    a plurality of vertical columns connected together to form a rack framework;
    at least one product support platform mounted on said vertical columns and including:
        a platform frame defining a front, a back, a left side, a right side, and a top surface;
        at least three horizontal, toothed beams extending from the left side of said platform frame to the right side of the platform frame, a rear toothed beam extending across the back of said frame, a forward toothed beam extending across the front of said frame, and a median toothed beam extending across said frame intermediate said forward and rear toothed beams;
        said median toothed beam having a substantially U-shaped cross-section, including a base and forward and rear upwardly-extending toothed legs;
        a plurality of regular roller strips extending from the forward toothed beam to the forward toothed leg of the median toothed beam, each regular roller strip including a beam and a plurality of rollers mounted on said beam, the top surfaces of said rollers lying in a plane which is at a higher elevation in the back of the rack than in the front of the rack, so as to provide a downwardly-sloping path for products to roll down by gravity to the front of the rack; and impact absorption means comprising a plurality of heavier duty roller strips extending from said rear toothed beam to said rear toothed leg of said intermediate toothed beam, said heavier duty roller strips each including a set of heavier duty rollers, which can absorb greater impact than the regular rollers without breaking, so that, when a product is dropped onto the back of said platform, said product contacts the heavier duty rollers on said heavier duty roller strips, and then rolls forward by gravity onto the regular rollers, thereby protecting the regular rollers against damage.

6. A gravity flow storage rack, comprising:

a plurality of vertical columns connected together to form a rack framework;

at least one product support platform mounted on said vertical columns and including:

a platform frame defining a front, a back, a left side, a right side, and a top surface;

a plurality of regular roller strips extending from the front of said frame toward the back of said frame and supported on said frame, each regular roller strip including a beam and a plurality of rollers mounted on said beam, the top surfaces of said rollers lying in a plane which is at a higher elevation in the back of the rack than in the front of the rack, so as to provide a downwardly-sloping path for products to roll down by gravity to the front of the rack; and impact absorption means comprising a plurality of heavy duty roller strips mounted on said frame and located in back of said regular roller strips, said heavy duty roller strips each including a set of heavier duty rollers, which can absorb greater impact than the regular rollers without breaking, so that, when a product is dropped onto the back of said platform, said product contacts the heavier duty rollers on said heavy duty roller strips and then rolls forward by gravity onto the regular rollers, thereby protecting the adjacent regular roller strips against damage.

* * * * *